United States Patent
Manabe et al.

(10) Patent No.: US 6,858,267 B2
(45) Date of Patent: Feb. 22, 2005

(54) LIQUID-CRYSTALLINE MEDIUM HAVING HIGH BIREFRINGENCE AND LIGHT STABILITY

(75) Inventors: Atsutaka Manabe, Bensheim (DE); Peer Kirsch, Seeheim-Jugenheim (DE); Gerald Unger, Weiterstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/414,050

(22) Filed: Apr. 16, 2003

(65) Prior Publication Data

US 2003/0197154 A1 Oct. 23, 2003

(30) Foreign Application Priority Data

Apr. 16, 2002 (DE) .......................... 102 16 852

(51) Int. Cl.[7] .......................... C09K 19/30; C09K 19/12
(52) U.S. Cl. ............... 428/1.1; 252/299.63; 252/299.66
(58) Field of Search ...................... 428/1.1; 252/299.63, 252/299.66

(56) References Cited

U.S. PATENT DOCUMENTS 6,124,005 A * 9/2000 Kondo et al. ................. 428/1.1
6,605,747 B2 * 8/2003 Kondo et al. ................. 568/642

FOREIGN PATENT DOCUMENTS

EP 1182186 * 2/2002

* cited by examiner

Primary Examiner—Shean C. Wu
(74) Attorney, Agent, or Firm—Millen, White, Zelano, Branigan, P.C.

(57) ABSTRACT

The invention relates to a liquid-crystalline medium comprising one or more compounds of the general formula (I)

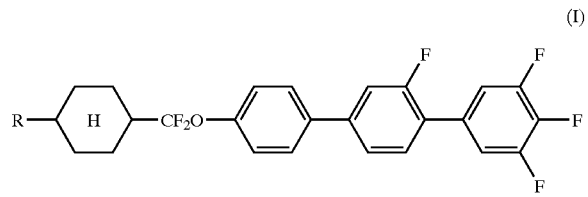

(I)

in which R is an alkyl radical, alkoxy radical or alkenyl radical having from 1 to 7 or 2 to 7 carbon atoms respectively, in which one or more $CH_2$ groups may be replaced by —O— in such a way that oxygen atoms are not adjacent, and in addition further liquid-crystalline compounds.

12 Claims, No Drawings

LIQUID-CRYSTALLINE MEDIUM HAVING HIGH BIREFRINGENCE AND LIGHT STABILITY

The present invention relates to a liquid-crystalline medium and to electro-optical displays containing this medium.

Liquid crystals are used mainly as dielectrics in display devices since the optical properties of such substances can be influenced by an applied voltage. Electro-optical devices based on liquid crystals are extremely well known to the person skilled in the art and can be based on various effects. Devices of this type are, for example, cells with dynamic scattering, DAP cells (deformation of aligned phases), guest/host cells, TN (twisted nematic) cells having a twisted nematic structure, STN (super-twisted nematic) cells, SBE (superbirefringence effect) cells and OMI (optical mode interference) cells. The most common display devices are based on the Schadt-Helfrich effect and have a twisted nematic structure.

In general, the liquid-crystal materials must have good chemical and thermal stability and good stability to electric fields and electromagnetic radiation. Furthermore, the liquid-crystal materials should have low viscosity and give rise to short response times, low threshold voltages and high contrast in the cells.

Furthermore, they should have a suitable mesophase, for example a nematic mesophase for the above-mentioned cells, at conventional operating temperatures, i.e. in the broadest possible range below and above room temperature. Since liquid crystals are generally used as mixtures of a plurality of components, it is important that the components are readily miscible with one another. Further properties, such as the electrical conductivity, the dielectric anisotropy and the optical anisotropy, have to meet various requirements depending on the cell type and area of application. For example, materials for cells having a twisted nematic structure should have a positive dielectric anisotropy and low electrical conductivity.

For example, for matrix liquid-crystal displays having integrated nonlinear elements for switching individual pixels (MLC displays), liquid-crystalline media having large positive dielectric anisotropy, broad nematic phases, relatively low birefringence, very high specific resistance, good light and temperature stability and low vapor pressure are desired.

Matrix liquid-crystal displays of this type are known. Besides passive elements, such as varistors or diodes, the nonlinear elements used for individual switching of the individual pixels can be active elements, such as transistors. The term "active matrix" is then used.

The electro-optical effect used in the highly promising TFT (thin film transistor) displays is usually the TN effect. A distinction is made between TFTs comprising compound semiconductors, such as, for example, CdSe, and TFTs based on polycrystalline or amorphous silicon.

The TFT matrix is applied to the inside of one glass plate of the display, while the other glass plate carries the transparent counterelectrode on the inside. Compared with the size of the pixel electrode, the TFT is very small and has virtually no adverse effect on the image. This technology can also be extended to fully color-compatible displays, in which a mosaic of red, green and blue filters is arranged in such a way that a filter element is arranged opposite each switchable pixel. The TFT displays usually work as TN cells with crossed polarizers in transmission and are illuminated from the back.

MLC displays of this type are employed as displays in notebook computers, TV sets (pocket televisions) and in automobile and aircraft construction. The angle dependence of the contrast and the response times of these MLC displays are not always satisfactory here.

Difficulties are also caused by inadequately high specific resistance of the liquid-crystal mixtures. With decreasing resistance, the contrast of an MLC display worsens, and the problem of "image sticking" can occur. Since the specific resistance of the liquid-crystal mixture generally decreases over the life of an MLC display due to interaction with the inside surfaces of the display, a high (initial) resistance is very important in order to give acceptable lives. In particular in the case of mixtures having a low threshold voltage, it has hitherto not been possible to achieve very high specific resistance values since liquid-crystalline materials having high positive dielectric anisotropy $\Delta\epsilon$ generally also have relatively high electrical conductivity. It is furthermore important that the specific resistance exhibits the smallest possible increase with increasing temperature and after exposure to heat and/or light. In order to achieve short response times of the displays, the mixtures must furthermore have low rotational viscosity. In order also to facilitate use of the displays at low temperatures, for example for applications outdoors, in automobiles or in avionics, crystallization and/or smectic phases should not occur even at low temperatures, and the temperature dependence of the viscosity must be as low as possible.

Liquid-crystal mixtures having a favorable property profile are also required in the liquid-crystal-on-silicon (LCoS) projection displays which have been developed recently. Owing to the small pixel size in the region of 20 $\mu$m, the high resolution and the desired short response times of the displays, small layer thicknesses are necessary, for the achievement of which liquid-crystal mixtures having a comparatively high value of the optical birefringence $\Delta$n are needed. Liquid-crystalline compounds having high birefringence frequently have an intrinsic smectic phase or induce the formation of a smectic phase when mixed with other liquid-crystalline compounds, which has an adverse effect on the low-temperature stability of the displays. Owing to operation in backlight mode, high light stability of the liquid-crystal mixtures employed in LCoS displays is of particular importance. In the past, tolan compounds were frequently employed as mixture components in order to give liquid-crystal mixtures having a high value for the optical birefringence $\Delta$n. However, these have inadequate UV stability, which is evident from a significant impairment of the voltage holding ratio of the liquid-crystal mixtures after UV exposure.

There is thus a high demand for liquid-crystalline media having the following properties:

high birefringence $\Delta$n for small layer thicknesses of the displays;

high positive dielectric anisotropy $\Delta\epsilon$ for low threshold voltage $V_{th}$;

low rotational viscosity $\gamma_1$ for short response times;

high stability to light radiation for a long life of the displays;

nematic phase range extended in particular to low temperatures and low temperature dependence of the viscosity for use of the displays at low temperatures too.

The invention has an object of providing liquid-crystalline media for IPS, MLC, TN or STN displays, but in particular for LCoS displays, which have very high specific resistance values, low threshold voltages, short response times, high birefringence values Δn and good UV stability while maintaining the other boundary conditions. Upon further study of the specification and appended claims, further objects and advantages of this invention will become apparent to those skilled in the art.

These and other objects are achieved by a liquid-crystalline medium comprising one or more compounds of the general formula (I)

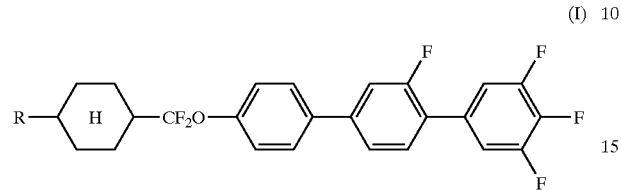
(I)

in which R is an alkyl radical, alkoxy radical or alkenyl radical having from 1 to 7 or 2 to 7 carbon atoms respectively, in which one or more $CH_2$ groups may be replaced by —O— in such a way that oxygen atoms are not adjacent.

Besides the compound(s) of the general formula (I), preferred liquid-crystalline media according to the invention also comprise one or more compounds of the general formula (II)

(II)

in which a, b and c, independently of one another, are

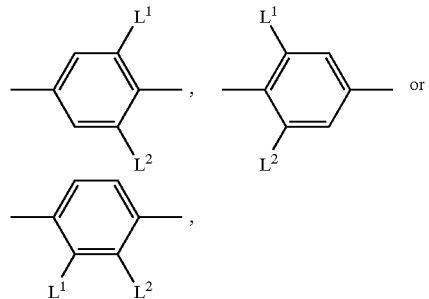

where $L^1$ and $L^2$, independently of one another, are —H or —F, and a may additionally be

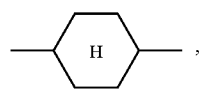

$Z^1$ and $Z^2$, independently of one another, are a single bond, —$CH_2$—$CH_2$— or —COO—, R and Y are an alkyl, alkoxy or alkenyl radical having from 1 to 7 or 2 to 7 carbon atoms respectively, in which one or more $CH_2$ groups may be replaced by —O— in such a way that two oxygen atoms are not adjacent, Y may additionally be —F, —Cl, —$OCF_3$, —$OCHF_2$, —$OCH_2F$ or —$CF_3$.

Particularly preferred liquid-crystalline media according to the invention comprise a) from 2 to 30% by weight, preferably from 5 to 25% by weight, of compounds of the general formula (I), b) from 10 to 70% by weight, preferably from 15 to 60% by weight, of compounds of the formula (II) in which

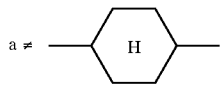

c) from 10 to 70% by weight, preferably from 15 to 50% by weight, of compounds of the formula (II) in which

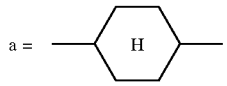

and d) from 0 to 30% by weight, preferably from 0 to 15% by weight, of further liquid-crystalline compounds.

Preferred further liquid-crystalline compounds d) are selected from the compounds of the general formulae (III) to (V):

$$R\text{-}e\text{-}Z^1\text{-}f\text{-}Y \qquad (III)$$

in which

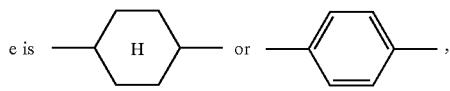

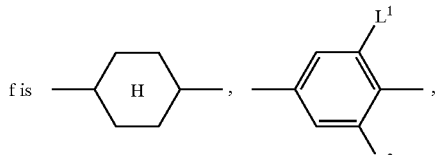

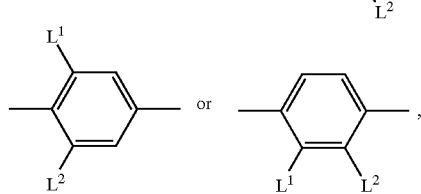

where $L^1$ and $L^2$, independently of one another, are —H or —F, and $Z^1$ is a single bond, —$CH_2$—$CH_2$— or —COO—, R and Y are an alkyl, alkoxy or alkenyl radical having from 1 to 7 or 2 to 7 carbon atoms respectively, in which one or more $CH_2$ groups may be replaced by —O— in such a way that oxygen atoms are not adjacent, Y may additionally be —F, —Cl, —$OCF_3$, —$OCHF_2$, —$OCH_2F$ or —$CF_3$,

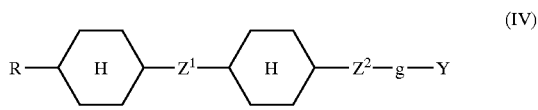
(IV)

in which

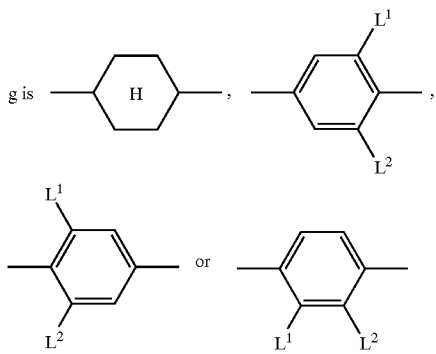

and
$L^1$, $L^2$, $Z^1$, $Z^2$, R and Y are as defined above, $$R\text{-}h\text{-}Z^1\text{-}i\text{-}Z^2\text{-}k\text{-}Z^3\text{-}l\text{-}Y \quad (V)$$

in which
h, i, k and l, independently of one another, are

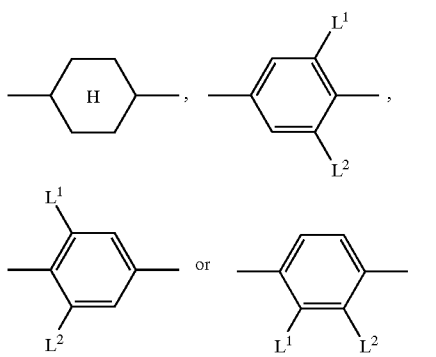

where
$L^1$ and $L^2$, independently of one another, are —H or —F,
$Z^1$, $Z^2$ and $Z^3$, independently of one another, are a single bond, —CH$_2$—CH$_2$— or —COO—, and
R and Y are as defined above.

R and Y in the formulae (II) to (V) may be an alkyl radical or an alkoxy radical having from 1 to 7 carbon atoms, which may be straight-chain or branched. It is preferably straight-chain, has 1, 2, 3, 4, 5, 6 or 7 carbon atoms and accordingly is preferably methyl, ethyl, propyl, butyl, pentyl, hexyl, heptyl, methoxy, ethoxy, propoxy, butoxy, pentoxy, hexoxy or heptoxy.

R and Y may be oxaalkyl, preferably straight-chain 2-oxapropyl (=methoxymethyl), 2- (=ethoxymethyl) or 3-oxabutyl (=methoxyethyl), 2-, 3- or 4-oxapentyl, 2-, 3-, 4- or 5-oxahexyl, or 2-, 3-, 4-, 5- or 6-oxaheptyl.

R and Y may be an alkenyl radical having from 2 to 7 carbon atoms, which may be straight-chain or branched. It is preferably straight-chain and accordingly is in particular vinyl, prop-1- or -2-enyl, but-1-, -2- or -3-enyl, pent-1-, -2-, -3- or -4-enyl, hex-1-, -2-, -3-, -4- or -5-enyl, or hept-1-, -2-, -3-, -4-, -5- or -6-enyl.

Y may furthermore additionally be —F, —Cl, —OCF$_3$, —OCHF$_2$, —OCH$_2$F or —CF$_3$.

Preferred compounds of the general formula (II) are the following compounds of the formulae (IIa) to (IIo):

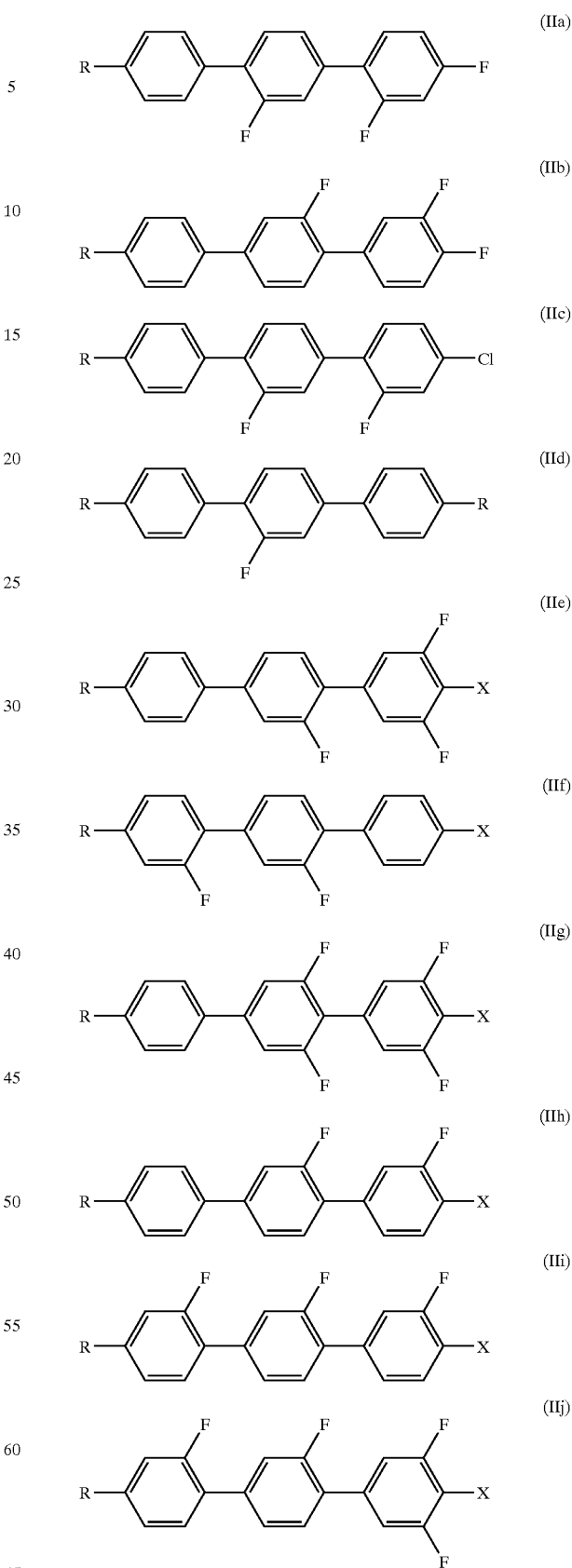

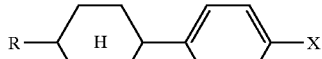 (IIk)

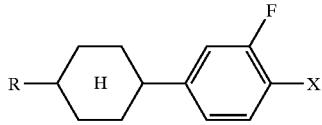 (IIl)

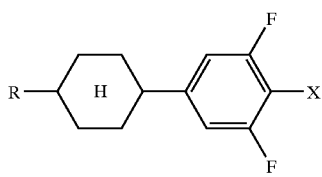 (IIm)

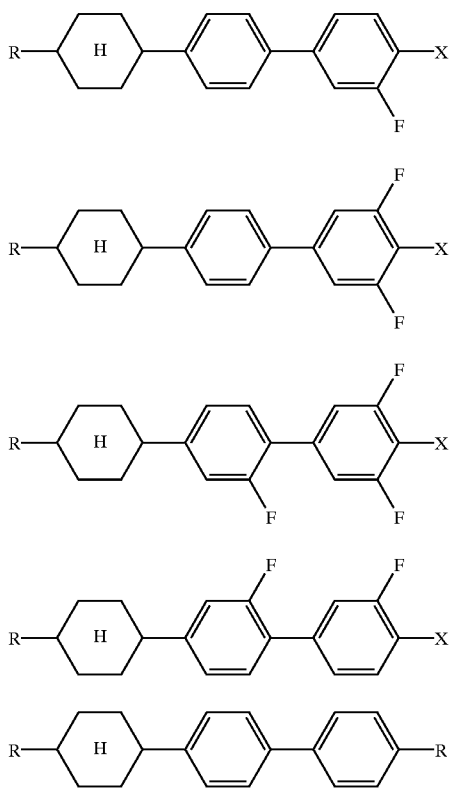

(IIn)

(IIo)

in which

R are independent of one another and are an alkyl, alkoxy or alkenyl radical having from 1 to 7 or 2 to 7 carbon atoms respectively, in which one or more $CH_2$ groups may be replaced by —O— in such a way that oxygen atoms are not adjacent, and X is —F, —Cl, —$OCF_3$, —$OCHF_2$, —$OCH_2F$ or —$CF_3$.

Preferred compounds of the general formulae (III) to (V) are the following compounds of the general formulae (IIIa) to (IIIf), (IVa) to (IVc) and (Va) to (Vj):

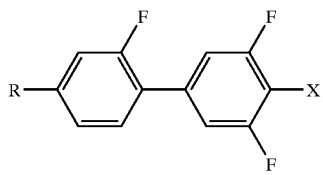 (IIIa)

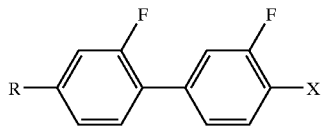 (IIIb)

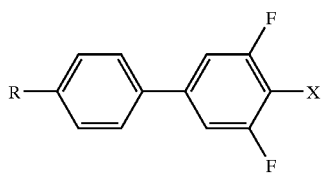 (IIIc)

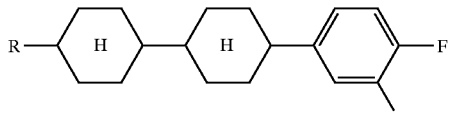 (IIId)

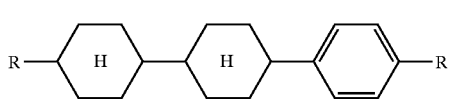 (IIIe)

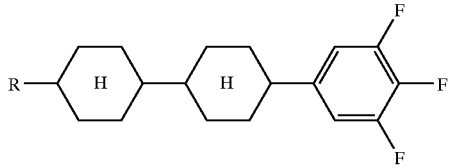 (IIIf)

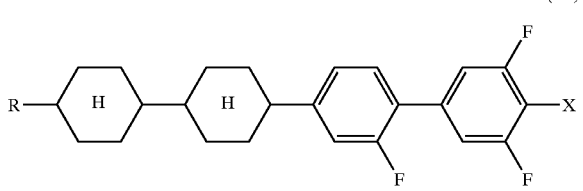

(IVa)

(IVb)

(IVc)

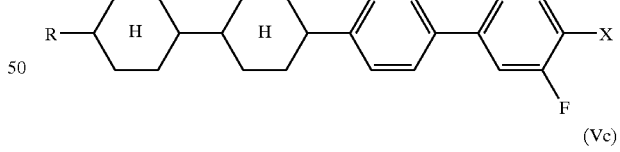 (Va)

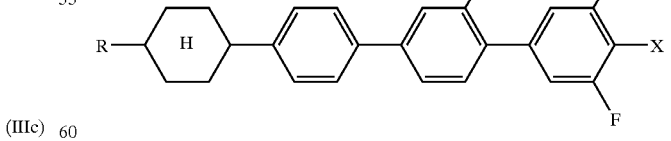 (Vb)

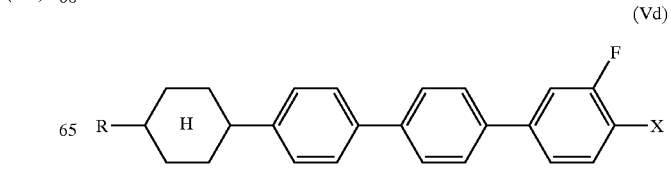

(Vc)

(Vd)

-continued

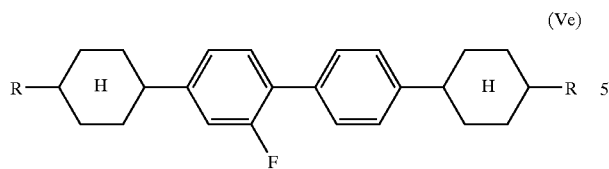
(Ve)

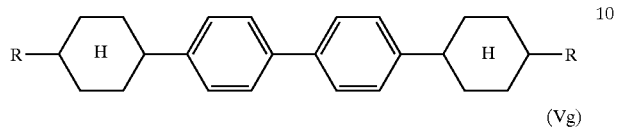
(Vf)

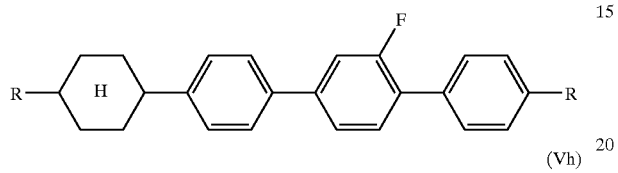
(Vg)

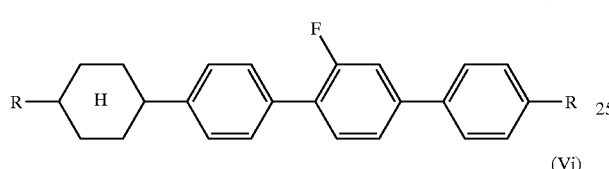
(Vh)

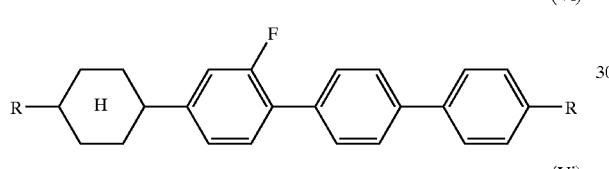
(Vi)

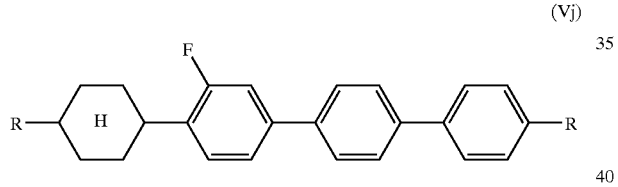
(Vj)

in which

R are independent of one another and are an alkyl, alkoxy or alkenyl radical having from 1 to 7 or 2 to 7 carbon atoms respectively, in which one or more $CH_2$ groups may be replaced by —O— in such a way that oxygen atoms are not adjacent, X is —F, —Cl, —$OCF_3$, —$OCHF_2$, —$OCH_2F$ or —$CF_3$.

The compounds of the general formulae (I) to (V) are indicated below by means of acronyms, where

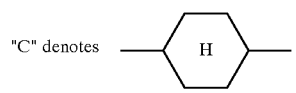
"C" denotes

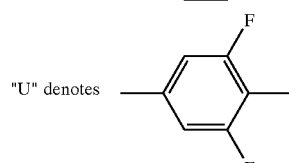
"U" denotes

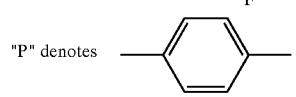
"P" denotes

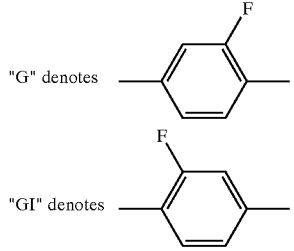
"G" denotes

"GI" denotes

"Q" denotes —$CF_2O$—
"n" means that R or Y=—$C_nH_{2n+1}$
"V" means that R or Y=—$CH=CH_2$
"kVn" means that R or Y=—$C_kH_{2k}$—$CH=CH$—$C_nH_{2n+1}$
"On" means that R or Y=—$OC_nH_{2n+1}$
"F" means that X or Y=—F
"Cl" means that X or Y=—Cl
"OT" means that X or Y=—$OCF_3$
"T" means that X or Y=—$CF_3$ The structure of the polycyclic basic structure is given first, followed—separated by a hyphen—by the substituents on the left-hand and right-hand side of the structural formulae. For example, the compound of the general formula (I) in which R=$C_nH_{2n+1}$ is referred to as CQPGU-n-F.

The preferred compound of the general formula (I) is CQPGU-3-F.

Particularly preferred compounds of the general formula (II) are PGIGI-3-F, GGP-5-Cl, CPG-2-F, CPG-3-F, CPG-5-F, CGU-2-F, CGU-3-F, CGU-5-F, PGU-2-F, PGU-3-F, CPP-3-2, PGU-5-F, CPU-2-F, CPU-3-F and CPU-5-F.

Particularly preferred compounds of the general formula (III) are GG-3-F, PU-3-F, GU-3-F, CP-3-F and CU-3-F.

Particularly preferred compounds of the general formula (IV) are CCG-2-F, CCG-3-F, CCG-5-F, CCU-2-F, CCU-3-F and CCU-5-F.

Particularly preferred compounds of the general formula (V) are CCGU-2-F, CCGU-3-F, CCPU-2-F, CCPU-3-F, CPGU-2-F, CPGU-3-F, CPPC-3-3, CPPC-3-5, CGPC-3-3, CGPC-3-5 and CGPC-5-3.

The compounds are prepared by methods known per se, as described in the literature for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail. Furthermore, the compounds of the formulae (I) to (V) can be prepared as described in the relevant patent literature.

The invention also relates to electro-optical displays, in particular STN or MLC display, having two plane-parallel outer plates which, with a frame, form a cell, integrated nonlinear elements for switching individual pixels on the outer plates, and a nematic liquid-crystal mixture of positive dielectric anisotropy located in the cell, which displays contain the liquid-crystalline media according to the invention, and to the use of these media for electro-optical displays. In particular, the invention also relates to LCoS displays which contain the liquid-crystalline media according to the invention.

The liquid-crystal mixtures according to the invention enable a significant extension of the available parameter latitude.

The achievable combinations of clearing point, rotational viscosity, optical anisotropy Δn, threshold voltage and UV stability exceed those of the previous materials from the prior art.

It has hitherto only been possible to meet the requirement for high birefringence at the same time as a high clearing point and a broad nematic phase range to an inadequate extent.

The liquid-crystal mixtures according to the invention enable clearing points above 80° C., preferably above 90° C., particularly preferably above 95° C., at the same time birefringence values of ≧0.16, preferably ≧0.17, particularly preferably ≧0.18, a low threshold voltage and at the same time low rotational viscosity to be achieved while retaining the nematic phase down to −15° C. and preferably down to −20° C., particularly preferably down to −25° C.

The construction of the STN and MLC displays according to the invention from polarizes, electrode base plates and electrodes with surface treatment corresponds to the usual design for displays of this type. The term usual design here is broadly drawn and also cover all derivatives and modifications of the MLC display, in particular also matrix display elements based on poly-Si TFT or MIM displays and IPS.

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and, after mixing, to remove the solvent again, for example by distillation. It is furthermore possible to prepare the mixtures in other conventional ways, for example by use of premixes, for example homologue mixtures, or using so-called "multi-bottle" systems.

The entire disclosure of all applications, patents and publications, cited herein and of corresponding German application No. 10216852.0, filed Apr. 16, 2002 are incorporated by reference herein.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

Example A and Comparative Example

Liquid-crystal mixtures having the stated composition are prepared. The following are measured for these mixtures:

temperature of the smectic-nematic phase transition S→N[° C.];

the clearing point [° C.];

the optical anisotropy Δn at 589 nm and 20° C.;

the rotational viscosity $\gamma_1$ at 20° C. [mPa.s];

the voltage $V_0$ (Freedericks transition) [V]

the dielectric anisotropy Δε at 1 kHz and 20° C.

The electro-optical data are measured in a TN cell at the 1st minimum (d·Δn=0.5 μm) at 20° C.

Example A

| Component | [% by wt.] |
| --- | --- |
| GGP-5-Cl | 16 |
| PGIGI-3-F | 7 |
| CPG-2-F | 7 |
| CPG-3-F | 7 |
| CPG-5-F | 7 |
| CGU-2-F | 6 |
| CGU-3-F | 6 |
| CGU-5-F | 6 |
| PGU-2-F | 8 |
| PGU-3-F | 8 |
| CCGU-3-F | 9 |
| CPP-3-2 | 4 |
| CGPC-3-3 | 2 |
| CGPC-5-3 | 2 |
| CQPGU-3-F | 5 |

S → N [°C.]: <−20° C.
Clearing point [°C.]: +100.0° C.
Δn: +0.1809
Δε: +14.7
$V_0$ [V]: +1.10

Comparative Example

| Component | [% by wt.] |
| --- | --- |
| GGP-5-Cl | 16 |
| CPG-2-F | 11 |
| CPG-3-F | 11 |
| CPG-5-F | 6 |
| CGU-2-F | 9 |
| CGU-3-F | 9 |
| CGU-5-F | 8 |
| CPU-3-F | 8 |
| CCGU-3-F | 7 |
| CPP-3-2 | 10 |
| CPPC-3-3 | 3 |
| CPPC-5-3 | 2 |

S → N [° C.]: <−20° C.
Clearing point [° C.]: +102.0° C.
Δn: +0.1610
Δε: +10.9
$V_0$ [V]: +1.14

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising:

one or more compounds of the formula (I):

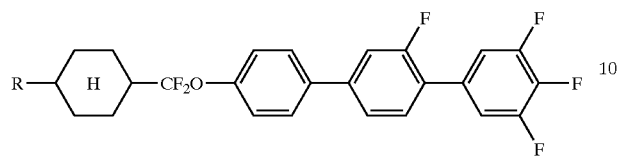
(I)

in which R is an alkyl radical, alkoxy radical or alkenyl radical having from 1 to 7 or 2 to 7 carbon atoms respectively, in which one or more $CH_2$ groups are optionally replaced by —O— in such a way that oxygen atoms are not adjacent; and one or more compounds of the formulae (IIa) and (IIc) to (IIo):

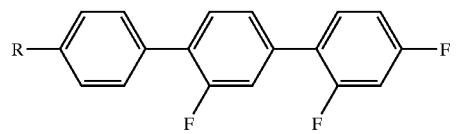
(IIa)

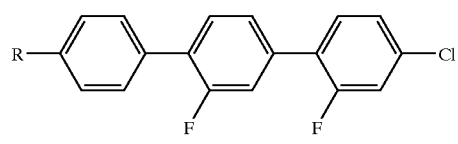
(IIc)

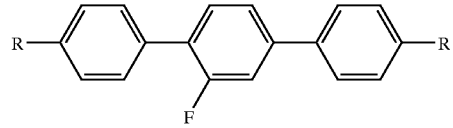
(IId)

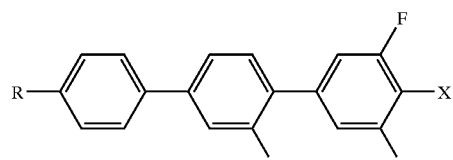
(IIe)

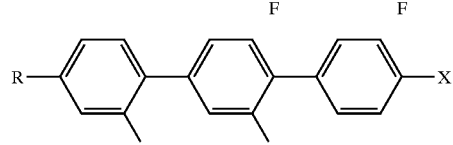
(IIf)

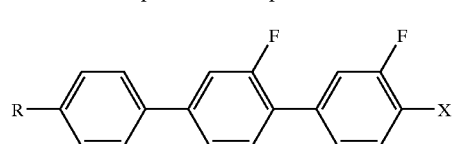
(IIg)

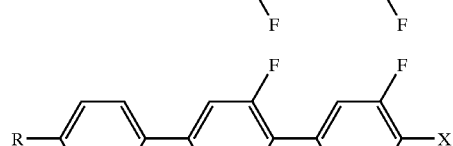
(IIh)

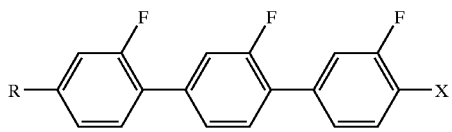
(IIi)

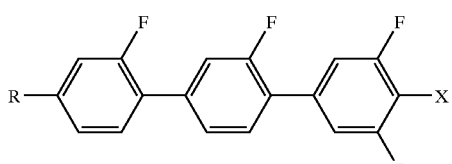
(IIj)

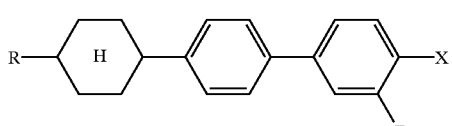
(IIk)

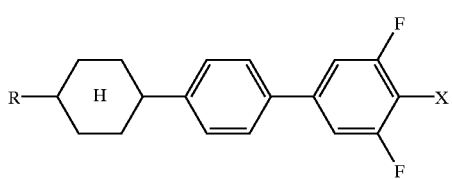
(IIl)

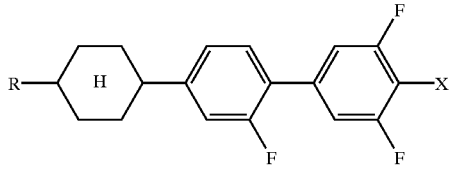
(IIm)

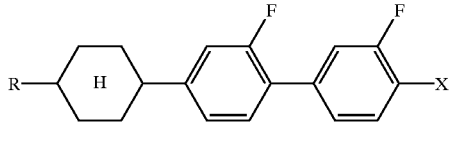
(IIn)

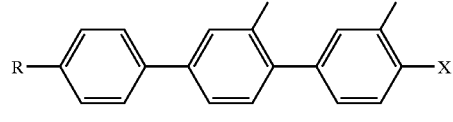
(IIo)

in which

R are independent of one another and are an alkyl, alkoxy or alkenyl radical having from 1 to 7 or 2 to 7 carbon atoms respectively, in which one or more $CH_2$ groups are optionally replaced by —O— in such a way that oxygen atoms are not adjacent, and X is —F, —Cl, —$OCF_3$, —$OCHF_2$, —$OCH_2F$ or —$CF_3$.

2. Liquid-crystalline medium according to claim 1 comprising a) from 2 to 30% by weight of compounds of the formula (I), b) from 10 to 70% by weight of compounds of the formulae (IIa) and (IIc) to (IIj), c) from 10 to 70% by weight of compounds of the formulae (IIk) to (IIo), and d) from 0 to 30% by weight of one or more other liquid-crystalline compounds.

3. A liquid-crystalline medium according to claim 2, where the one or more other liquid-crystalline compounds are selected from the compounds of the formulae (III) to (V):

  (III)

in which e is 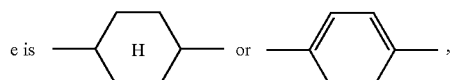

f is 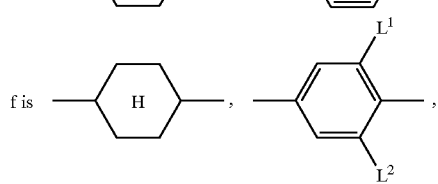

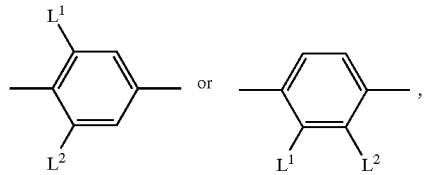

where $L^1$ and $L^2$, independently of one another, are —H or —F, $Z^1$ is a single bond, —CH$_2$—CH$_2$— or —COO—, R and Y are an alkyl, alkoxy or alkenyl radical having from 1 to 7 or 2 to 7 carbon atoms respectively, in which one or more CH$_2$ groups are optionally replaced by —O— in such a way that oxygen atoms are not adjacent, and Y may additionally be —F, —Cl, —OCF$_3$, —OCHF$_2$, —OCH$_2$F or —CF$_3$;

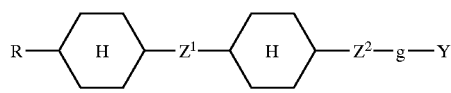  (IV)

in which g is 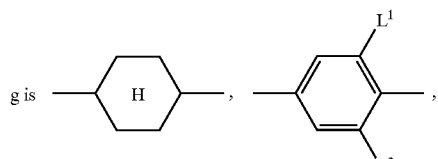

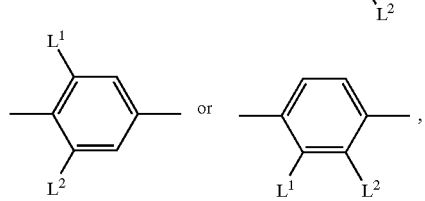

and $L^1$, $L^2$, $Z^1$, R and Y are as defined above, and $Z^2$ is independently as defined for $Z^1$;

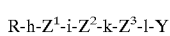  (V)

in which h, i, k and l, independently of one another, are

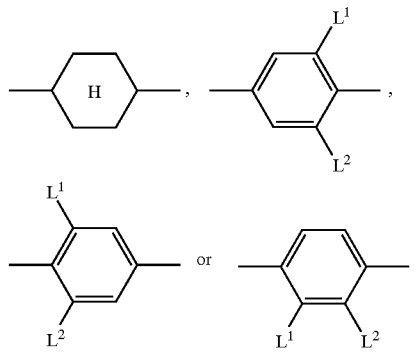

where $L^1$ and $L^2$, independently of one another, are —H or —F, $Z^1$, $Z^2$ and $Z^3$, independently of one another, are a single bond, —CH$_2$—CH$_2$— or —COO—, and R and Y are as defined above.

4. A liquid-crystalline medium according claim 3, comprising, as compounds of the formulae (III) to (V), one or more compounds of the formulae (IIIa) to (IIIf), (IVa) to (IVc) and/or (Va) to (Vj):

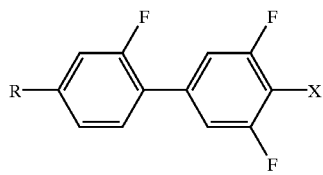  (IIIa)

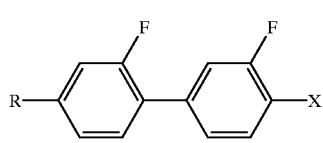  (IIIb)

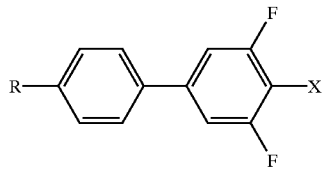  (IIIc)

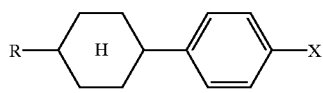  (IIId)

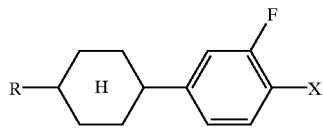  (IIIe)

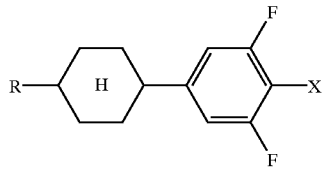  (IIIf)

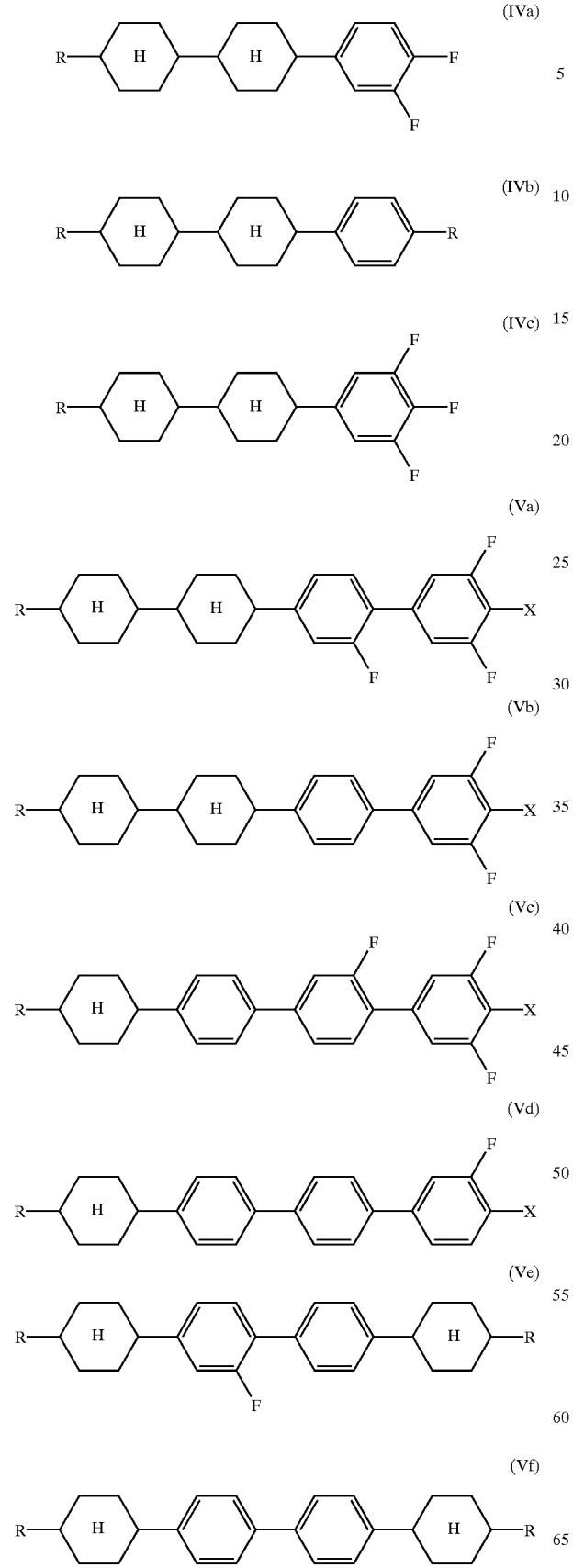

in which

R are independent of one another and are an alkyl, alkoxy or alkenyl radical having from 1 to 7 or 2 to 7 carbon atoms respectively, in which one or more $CH_2$ groups are optionally replaced by —O— in such a way that oxygen atoms are not adjacent, and X is —F, —Cl, —$OCF_3$, —$OCHF_2$, —$OCH_2F$ or —$CF_3$.

5. An electro-optical display containing a liquid-crystalline medium according to claim 1.

6. An electro-optical display containing a liquid-crystalline medium according to claim 2.

7. An electro-optical display containing a liquid-crystalline medium according to claim 3.

8. An electro-optical display having two plane-parallel outer plates which, with a frame, form a cell, integrated nonlinear elements for switching individual pixels on the outer plates and a nematic liquid-crystal medium according to claim 1 of positive dielectric anisotropy located in the cell.

9. An electro-optical display according to claim 8, wherein the display is an LCoS display, STN display or MLC display.

10. A liquid-crystalline medium of claim 1, having a clearing point above 80° C., a birefringence value of ≧0.16, and a nematic phase down to at least −15° C.

11. A liquid-crystalline medium of claim 1, having a clearing point above 90° C., a birefringence value of ≧0.17, and a nematic phase down to at least −20° C.

12. An electro-optical display according to claim 8, wherein the display is an LCoS display.

* * * * *